United States Patent
Hyde et al.

(10) Patent No.: US 8,009,048 B2
(45) Date of Patent: Aug. 30, 2011

(54) ELECTRONIC TAG AND SYSTEM WITH CONDITIONAL RESPONSE CORRESPONDING TO AT LEAST ONE PLANT ATTRIBUTE

(75) Inventors: Roderick A Hyde, Redmond, WA (US);
Muriel Y. Ishikawa, Livermore, CA (US); Jordin T. Kare, Seattle, WA (US);
Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 340 days.

(21) Appl. No.: 12/378,481

(22) Filed: Feb. 13, 2009

(65) Prior Publication Data
US 2009/0237212 A1    Sep. 24, 2009

Related U.S. Application Data

(63) Continuation-in-part of application No. 12/077,066, filed on Mar. 14, 2008, and a continuation-in-part of application No. 12/215,674, filed on Jun. 27, 2008, and a continuation-in-part of application No. 12/283,299, filed on Sep. 9, 2008, and a continuation-in-part of application No. 12/290,011, filed on Oct. 23, 2008, and a continuation-in-part of application No. 12/317,928, filed on Dec. 29, 2008.

(51) Int. Cl.
*G08B 13/14* (2006.01)
(52) U.S. Cl. .............. 340/572.1; 340/10.1; 144/335; 47/1.01 R; 47/58.1 R
(58) Field of Classification Search .... 340/572.1–572.8, 340/10.1; 144/335; 47/1.01 R, 58.1 R
See application file for complete search history.

(56) References Cited

U.S. PATENT DOCUMENTS

| | | | |
|---|---|---|---|
| 4,379,372 A | 4/1983 | Alexander et al. | |
| 4,570,368 A | 2/1986 | Stover | |
| 4,972,616 A * | 11/1990 | Doll | 40/645 |
| 5,339,517 A | 8/1994 | Diemer | |
| 6,597,465 B1 | 7/2003 | Jarchow et al. | |
| 6,671,698 B2 * | 12/2003 | Pickett et al. | 1/1 |
| 6,701,665 B1 | 3/2004 | Ton et al. | |
| 6,888,458 B2 * | 5/2005 | Carlson | 340/572.1 |
| 6,963,881 B2 | 11/2005 | Pickett et al. | |
| 7,076,900 B2 | 7/2006 | Faulkner | |
| 7,200,804 B1 * | 4/2007 | Khavari et al. | 715/230 |

(Continued)

FOREIGN PATENT DOCUMENTS
JP    2006101739 (A)    4/2006

(Continued)

OTHER PUBLICATIONS

Data Identifier and Application Identifier Standard, American National Standard, Material Handling Industry (Oct. 9, 2006), pp. 1-110.

(Continued)

*Primary Examiner* — Eric M Blount
(74) *Attorney, Agent, or Firm* — Christopher A. Wiklof; Graybeal Jackson LLP

(57) ABSTRACT

A system for tracking plants includes electronic tags configured to conditionally respond to interrogation, the condition response corresponding to data stored in the tag and/or one or more environmental parameters corresponding to one or more plants.

58 Claims, 8 Drawing Sheets

U.S. PATENT DOCUMENTS

| | | |
|---|---|---|
| 7,316,202 B2 | 1/2008 | Fantin et al. |
| 7,403,855 B2 | 7/2008 | Fuessley et al. |
| 7,702,462 B2 | 4/2010 | Fuessley et al. |
| 7,761,334 B2 | 7/2010 | Pickett et al. |
| 7,798,746 B2 | 9/2010 | Byles |
| 2002/0170229 A1 | 11/2002 | Ton et al. |
| 2004/0088330 A1 | 5/2004 | Pickett et al. |
| 2004/0088916 A1 | 5/2004 | Ton et al. |
| 2006/0080819 A1 | 4/2006 | McAllister |
| 2006/0116791 A1 | 6/2006 | Ravula et al. |
| 2007/0044445 A1 | 3/2007 | Spicer et al. |
| 2007/0079536 A1* | 4/2007 | Hall ........................ 40/299.01 |
| 2007/0152045 A1 | 7/2007 | Erickson et al. |
| 2007/0185749 A1 | 8/2007 | Anderson et al. |
| 2008/0074254 A1* | 3/2008 | Townsend et al. ......... 340/572.1 |
| 2009/0042180 A1* | 2/2009 | Lafferty et al. ................... 435/4 |
| 2009/0128336 A1 | 5/2009 | Huang et al. |

FOREIGN PATENT DOCUMENTS

| | | |
|---|---|---|
| WO | WO 2004023377 A1 * | 3/2004 |
| WO | WO 2007042327 A1 * | 4/2007 |

OTHER PUBLICATIONS

Hyde et al.; U.S. Appl. No. 12/077,066, filed Mar. 14, 2008.
Hyde et al.; U.S. Appl. No. 12/215,674, filed Jun. 27, 2008.
Hyde et al; U.S. Appl. No. 12/283,299, filed Sep. 9, 2008.
Hyde et al; U.S. Appl. No. 12/290,011, filed Oct. 23, 2008.
Hyde et al; U.S. Appl. No. 12/317,928, filed Dec. 29, 2008.

* cited by examiner

ELECTRONIC TAG AND SYSTEM WITH CONDITIONAL RESPONSE CORRESPONDING TO AT LEAST ONE PLANT ATTRIBUTE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/077,066, entitled METHOD AND APPARATUS FOR TRACKING PLANTS WITH AN ELECTRONIC TAG, naming Roderick A. Hyde, Muriel Y. Ishikawa, Jordin T. Kare, and Lowell L. Wood, Jr. as inventors, filed Mar. 14, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/215,674, entitled METHOD AND SYSTEM FOR CORRELATING EXTERNAL DATA TO A PLANT WITH AN ELECTRONIC TAG, naming Roderick A. Hyde, Muriel Y. Ishikawa, Jordin T. Kare, and Lowell L. Wood, Jr. as inventors, filed Jun. 27, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/283,299, entitled ELECTRONIC TAG AND METHOD FOR USING AN ELECTRONIC TAG CONFIGURED TO TRACK AT LEAST ONE PLANT, naming Roderick A. Hyde, Muriel Y. Ishikawa, Jordin T. Kare, and Lowell L. Wood, Jr. as inventors, filed Sep. 9, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/290,011, entitled ELECTRONIC TAG CONFIGURED TO SENSE A PLANT ENVIRONMENT, naming Roderick A. Hyde, Muriel Y. Ishikawa, Jordin T. Kare, and Lowell L. Wood, Jr. as inventors, filed Oct. 23, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/317,928, entitled SYSTEM FOR TREATING AT LEAST ONE PLANT INCLUDING A TREATMENT APPARATUS AND AN ELECTRONIC TAG INTERROGATOR, naming Roderick A. Hyde, Muriel Y. Ishikawa, Jordin T. Kare, and Lowell L. Wood, Jr. as inventors, filed Dec. 29, 1008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week 11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, a system for tracking plants may include electronic tags configured to conditionally respond to interrogation, the response condition corresponding to data stored in the tag and/or one or more sensed environmental or plant parameters. An electronic tag interrogator may transmit an addressed or broadcast conditional interrogation specifying a plant attribute or an environmental or plant parameter and receive responses from electronic tags meeting the response condition.

According to an embodiment, an electronic tag may be configured to conditionally respond to interrogation according to a relationship between stored data, such as data other than the electronic tag identity, and/or a sensed value and a parameter specified in a conditional interrogation. The response may include transmitting corresponding electronic tag identification data and/or transmitting additional data.

According to an embodiment, the conditional response characteristics of an electronic tag may be configured responsive to receipt of a configuration command, such as via a configuration command received through an interrogation interface.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
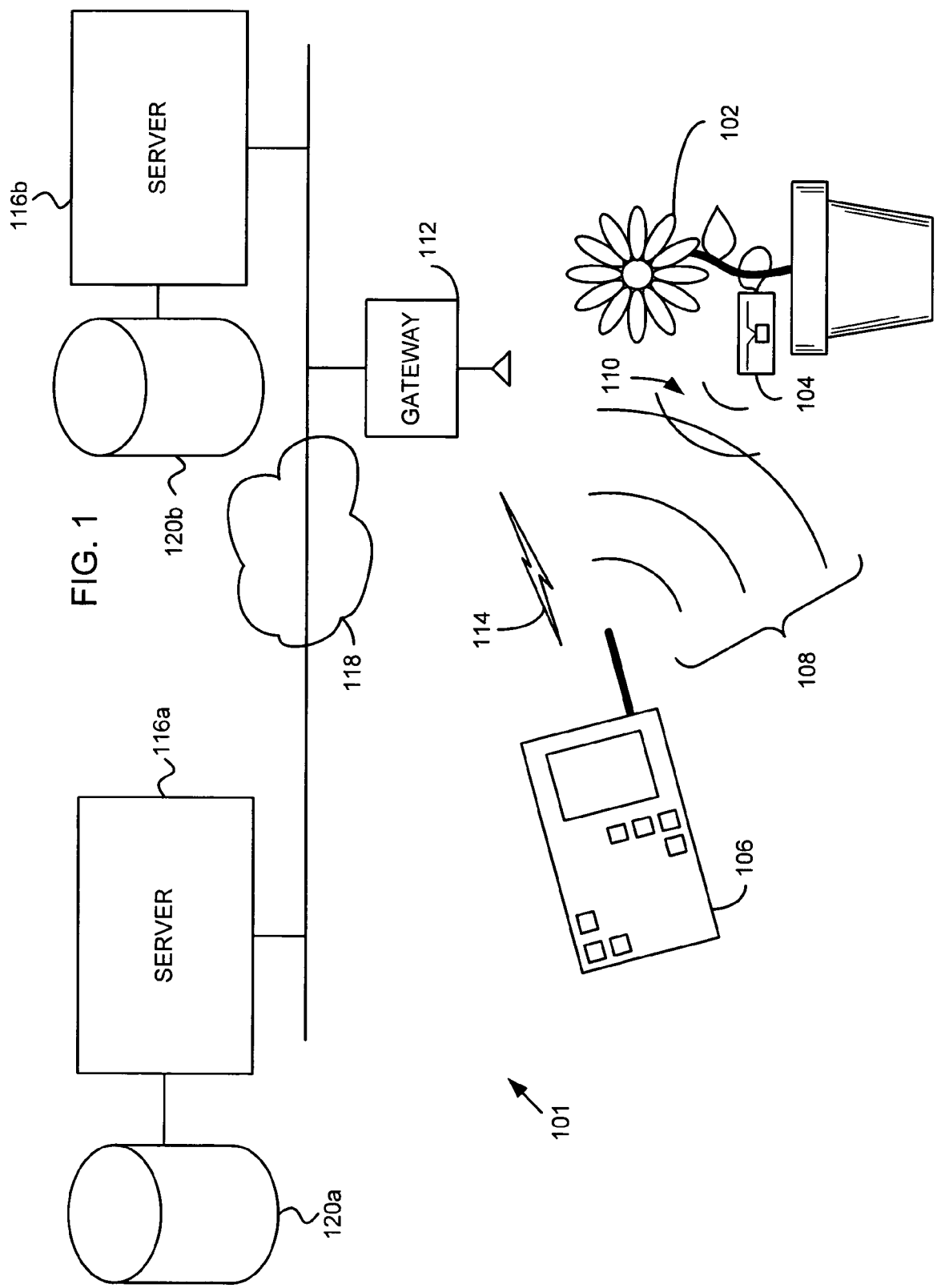
FIG. 1 is an illustrative diagram of a system configured to interface to one or more populations of electronic tags and for performing methods described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is an illustrative diagram of a system 101 for interfacing to one or more electronic tags 104 coupled to one or more plants 102 according to an embodiment. An electronic tag interrogator 106 may interrogate the electronic tag 104 to receive identification data corresponding to the at least one plant 102. For example, the electronic tag interrogator 106 may include a radio frequency identification (RFID) interrogator that is configured to emit an interrogation field 108 including a radio frequency signal to illuminate one or more radio frequency tags (RF tags) 104. The interrogation field or interrogation signal 108 may be modulated with an appropriate pattern for evoking a response 110 from the RF tag 104. According to some embodiments, the electronic tag interrogator may be in the form of a hand-held and/or portable apparatus that may optionally be in communication with a remote device 112 via a communication signal 114. For example, the remote device 112 may include a gateway, host computer, etc. configured to communicate with the electronic tag interrogator 106 via a radio communication signal 114.

According to an embodiment, the remote device 112 may be operatively coupled to a second remote device 116a, such as a server, over a network 118. The second remote device 116a may include a storage apparatus 120a configured to store at least a portion of a database including information corresponding to the identification data from the electronic tag 104 and the associated at least one plant 102. The remote device 112 may be operatively coupled to a third remote device 116b such as a server, over the network 118. The third remote device 116b may also include a storage apparatus 120b configured to store at least a portion of a database including information corresponding to the identification data from the electronic tag 104 and the associated at least one plant 102.

Embodiments of electronic tags may include user-writable memory. The memory contents may be determined by the user. The user may structure data in the memory according to open or closed standards. According to some embodiments, the memory of the electronic tag may include data structured for access by a plurality of trading partners. As will be described additionally below, electronic tags may be configured to remain with at least one plant 102 while the at least one plant 102 proceeds to market.

The electronic tag 104 may, for example, include various types of electronic tags including a radio frequency tag, such as a passive radio frequency tag, an active radio frequency tag, a backscatter radio frequency tag, a half-duplex radio frequency tag, or a full-duplex radio frequency tag, for example; a touch memory device; a proximity card; a smart card; a photonic tag; etc. Accordingly, the interrogation signal 108 and response signal 110 may include corresponding forms such as radio frequency interrogation and response, touch memory interrogation and response, proximity card interrogation and response, smart card interrogation and response, etc.

Additionally, electronic tags may include read-only, read/write, and write-once-read-many-times (WORM) capabilities. In the case of a writable tag technology such as a read/write or WORM, the relationship shown diagrammatically in FIG. 1 may include writing data from the interrogator 106 to the electronic tag 104 via the interrogation signal 108 and response 110. According to an embodiment, the interrogator 106 may write to the electronic tag 104 identification data and/or one or more external data coordinates and/or other data associated with accessing external data related to the at least one plant 102.

While the at least one plant 102 is illustrated as a single plant in a pot, other forms are contemplated such as flats, rows, pallets, bare root, root ball, groupings, arrangements, beddings, portable gardens, etc.

The at least one plant may include at least one seed, cutting, rhizome, bulb, corm, tuber, annual, biennial, cut flower, perennial, grass, creeper, climber, vine, fern, shrub, bush, or tree.

Figure 2:
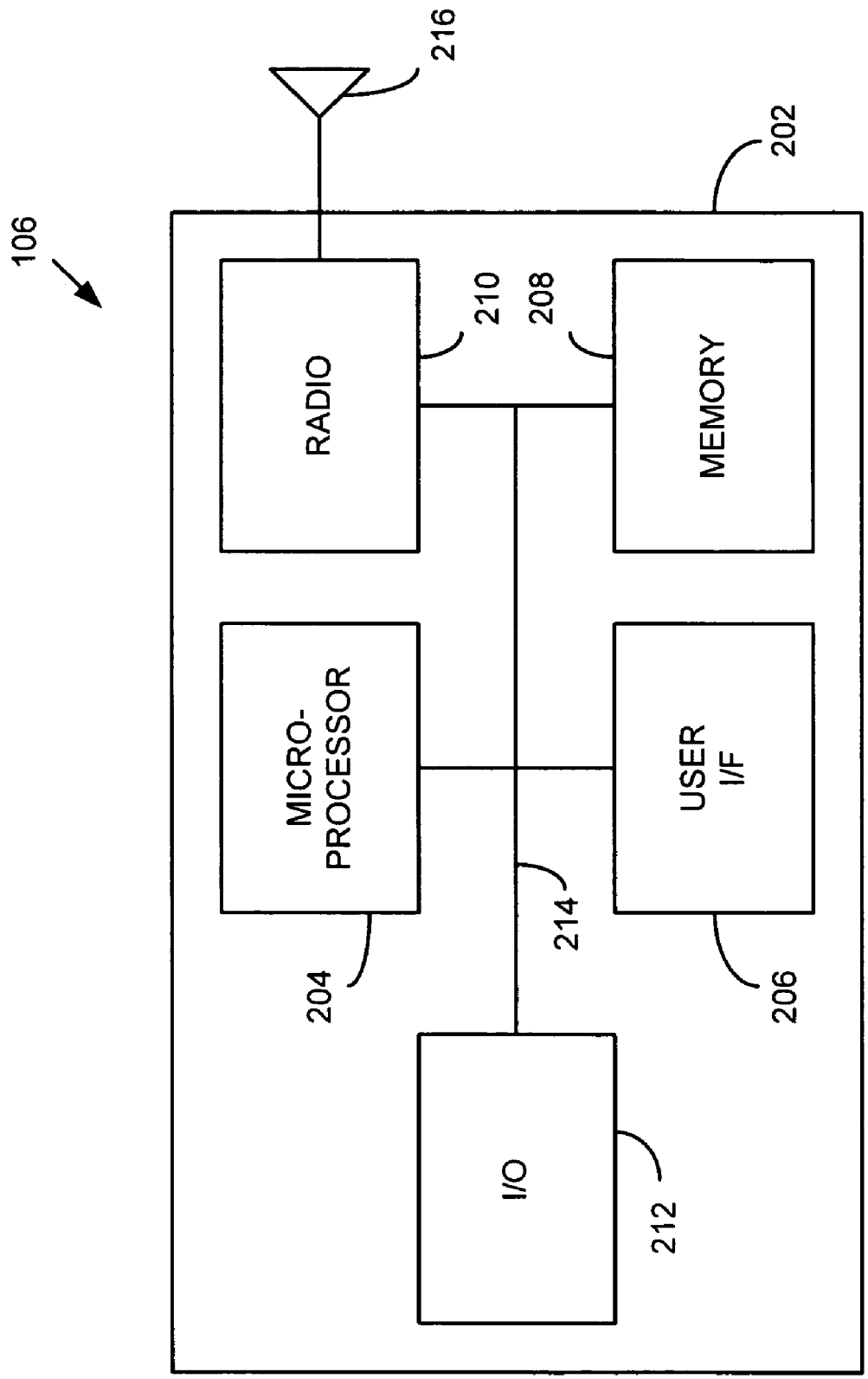
FIG. 2 is a block diagram of an illustrative electronic tag interrogator as depicted in FIG. 1, according to an embodiment.

FIG. 2 is a block diagram of an illustrative electronic tag interrogator 106 as depicted in FIG. 1, according to an embodiment. The electronic tag interrogator 106 may be embodied, for example, as an RF tag interrogator. The interrogator 106 may include a housing 202 substantially enclosing a microprocessor 204, user interface 206, memory circuitry 208, a radio configured to interrogate one or more types of RF tags, and an interface 212 operatively connected by one or more data buses 214. The radio 210 may include one or more antennas 216 operable to illuminate one or more RF tags with an interrogation field and receive a response signal from the one or more RF tags. The interface 212 may itself include a radio configured for communication with a host computer or computer network.

The interrogator 106 may be operable to run a computer program such as a data parsing program configured to parse data pertaining to one or more plants from one or more RF tags, and determine one or more external data coordinates corresponding to a database holding information corresponding to the data. Additionally or alternatively, the interrogator 106 may be operable to transmit received data over the interface 212 to a remote processing resource 112, 116a, 116b and receive information corresponding to the at least one plant (not shown) from the remote processing resource.

According to an illustrative embodiment, the RF tag interrogator 106 may receive a command such as a trigger pull through the user interface 206, interrogate an RF tag associated with at least one plant (not shown) with the radio 210 and at least one antenna 216 to receive data corresponding to the at least one plant, temporarily write received data to workspace in the memory circuitry 208, and execute a program from memory circuitry 208 with the microprocessor 204 to determine a location of an external resource for performing a query of or writing data to an external database.

Referring back to FIG. 1, one or more external resources or servers 120a, 120b may provide logical linkages between electronic tags 104, databases for storing data corresponding to the at least one population of at least one plants, tag population query nodes or other functions. The two or more external resources 120a, 120b may each include a portion of information related to the at least one plant. Alternatively, the two or more external resources 120a, 120b may represent a plurality of potential resources for storing or retrieving data related to the at least one plant, supporting networked query functions, and provide other resources related to reading, writing, and tracking.

Each external resource 120a, 120b that includes data disposed therein related to at least one plant includes the data also disposed on the database for identifying a portion of the database corresponding to the at least one plant.

The electronic tag interrogator 106 may include a computer program configured to store additional data corresponding to a record of additional treatments provided to the at least one plant upon such treatment application. The electronic tag interrogator 106 may include a computer program configured to retrieve from the database at least a portion of the data corresponding to the care of the at least one plant and determine whether a treatment is scheduled to be provided to the at least one plant. The electronic tag interrogator 106 may provide an indication to administer the treatment to the at least one plant if the treatment is scheduled. Upon receiving acknowledgement of the treatment being provided, the electronic tag interrogator 106 may then store in the database data corresponding to a record of providing the treatment.

The electronic tag interrogator 106 may further store location data in an industry accessible registry, the location data corresponding to an address for accessing the database. For example, server 120a may be a resource that provides the database for storing treatment information for plants, and server 120b may be a resource that provides a database for storing one or more locations of server(s) 120a, where multiple instances of servers 120a are accessible for query and/or writing.

Referring to FIG. 1, a software program running on server 120a may associate in a database 116a data corresponding to the care of at least one plant 102 with data identifying the at least one plant 102. The data identifying the at least one plant 102 may be retained in an electronic identification tag 104 associated with each at least one plant 102. The data corresponding to the care of the at least one plant 102 may include plant care instructions or a record of at least one plant care treatment provided to the at least one plant 102.

For embodiments where the electronic tag 104 is writable, the electronic tag interrogator 106 may write to the electronic identification tag 104 a location corresponding to the database 116a where related data is disposed. Additionally or alternatively, the external resource 120a, the electronic tag interrogator 106, or another computing resource may transmit to a second resource 120b at least a portion of the data identifying the at least one plant and data corresponding to the location of the first database 116b for storage on the second database 116b. The data corresponding to the location of the first database 116a may be an accessible address such as an IP address or a URL from which the data corresponding to the care of the at least one plant may be retrieved.

Other embodiments may include additional or reduced functionality in the interrogator 106, may rely on increased or reduced functionality in an external resource, may be operated by a user or operate automatically, may be interfaced to a treatment device to detect treatments, and/or may rely on alternative interrogation technologies. The interface 212 may include a wired interface and/or an intermittent interface such as a memory stick, USB drive, or other detachable memory.

Figure 3:
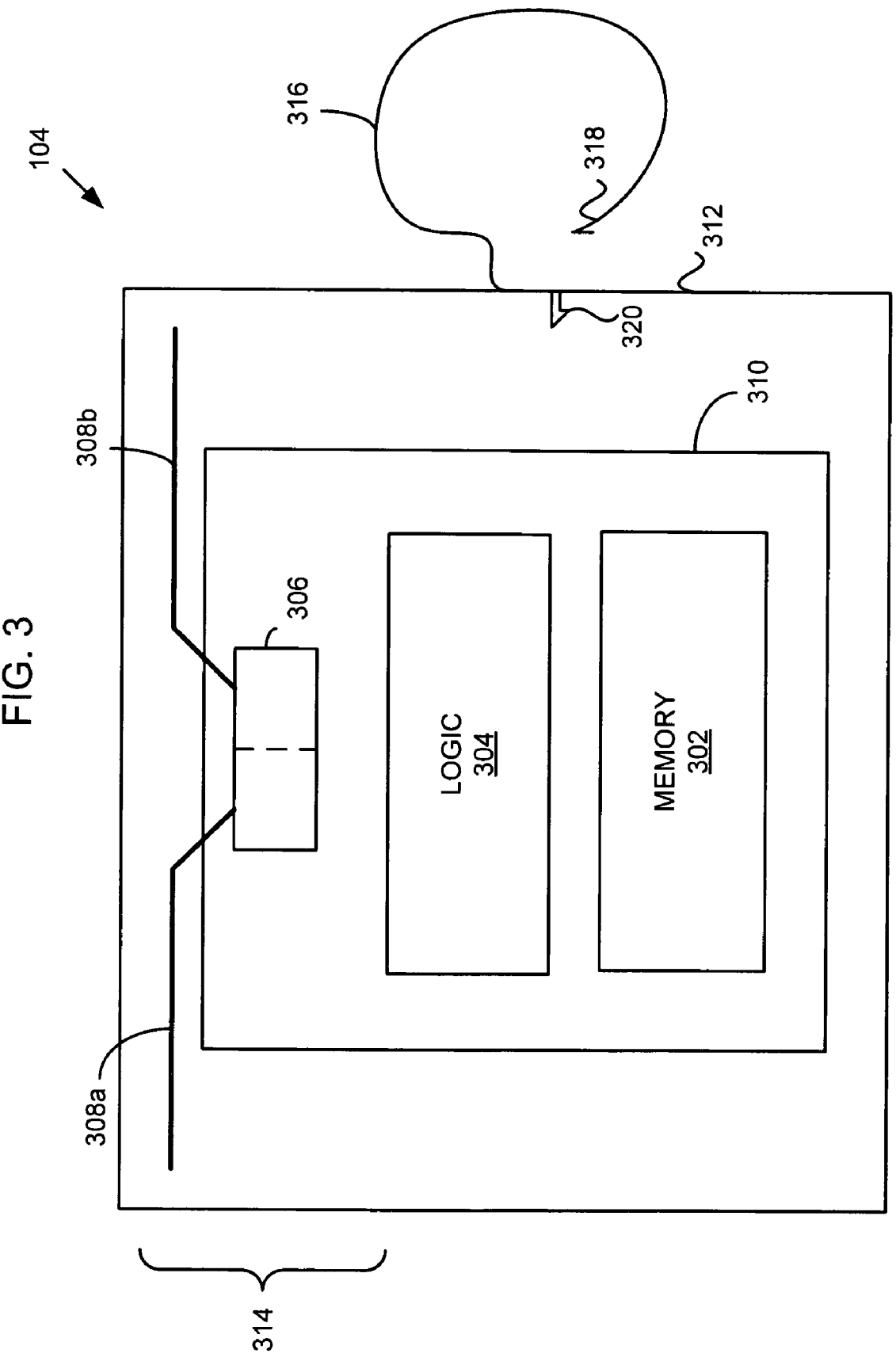
FIG. 3 is a block diagram of an illustrative electronic tag as depicted in FIG. 1, according to an embodiment.

FIG. 3 is a block diagram of an illustrative electronic tag 104 as depicted in FIG. 1, according to an embodiment wherein the electronic tag is in the form of a radio frequency (RF) tag. The RF tag 104 includes a memory circuit 302 (which may be read/write, WORM, or read-only, for example) and a logic circuit 304 operatively coupled to the memory circuit 302. A radio frequency transceiver 306 is operatively coupled to the logic circuit 304. The radio frequency transceiver may be further coupled to an antenna 308a, 308b which may include two respective antenna segments 308a and 308b. The radio frequency transceiver 306 may be configured to provide a switched connection between the antenna segments 308a and 308b. According to an embodiment, the memory circuit 302, logic circuit 304, and transceiver 306 may be formed on a die 310 as an integrated circuit. The integrated circuit 310 and the antenna 308a, 308b may be disposed in a package 312 that may include a printed circuit, for example.

The antenna 308a, 308b, transceiver 306, and optionally at least a portion of the logic circuit 304 may provide an interrogation interface 314 configured to communicate with an external interrogator (not shown). According to an embodiment, the transceiver 306 may hold the antenna portions 308a and 308b in substantial continuity during a first portion of a communication session. During the first portion of the communication session, an interrogation signal (not shown) in the form of radio frequency illumination may be received by the antenna 308a, 308b. In the case of a passive electronic tag 104, the radio frequency illumination may provide an AC voltage that is rectified by a portion of the transceiver 306 and used to charge one or more capacitors (not shown) that in turn provide DC power rails to operate the transceiver 306, logic 304, and memory 302. When the interrogation signal is received, the capacitor(s) charge and the transceiver 306, logic 304, and optionally the memory 302 may be powered up. According to some embodiments, it may be advantageous to power up only portions of the electronic tag 104 as the portions are needed.

Various messages may be encoded on the interrogation field. For example, one message may request tag ID, such as a segment of data by which the unique identity of the electronic tag 104 may be identified. Another message may specify a tag ID and request a portion or more of data held in the memory 302 of the particular electronic tag associated with the tag ID. According to one embodiment, the electronic tag 104 may respond to a data request in half-duplex as a backscatter signal.

For example, the electronic tag 104 may receive a request for at least a portion of data from the memory 302 over a modulated interrogation field (not shown) during a first portion of the communication session. The interrogator (not shown) may then cease to modulate the interrogation signal but maintain illumination of the signal onto the antenna 308a, 308b. The logic circuit 304 (powered by the illumination provided by the interrogation signal) then fetches the requested portion of data from the memory 302 and outputs the data to the transceiver 306. The transceiver 306 selectively couples and uncouples the portions of the antenna 308a, 308b in a pattern corresponding to the data received from the logic 304. The selective coupling and uncoupling of the antenna portions 308a, 308b creates a corresponding variation in reflectivity to the radio frequency illumination provided by the antenna. The variation in reflection may then be detected by the interrogator (not shown) and converted into data corresponding to the data fetched from memory 302.

Of course, substantial handshaking, error correction, and other interactions between the interrogation signal (not shown) and the response signal (not shown) may be used to improve communication reliability, extend range, and/or provide other capabilities.

Similarly, data may be written from an interrogator (not shown) to the memory 302 of an electronic tag 104 using a similar approach. Data that may be written to and/or read from the memory 302 an electronic tag 104 may include a range of contents. For example, the data may include an identifier corresponding to the at least one plant and/or one or more data coordinates referencing external data locations corresponding to the at least one plant.

According to an embodiment, the package 312 may include encapsulation or other form of protection for the circuitry and/or antenna. The package 312 may include a coupling 316 configured to couple to at least one plant to attachment to a plant (not shown). In the example of FIGS. 1 and 3, the coupling 316 may include a loop such as a "zip tie" or lanyard that provides a permanent or semi-permanent association with a plant or a group of plants. According to an embodiment, the coupling 316 may be formed integrally with the package 312 for convenient attachment to one or more plants.

The coupling 316 may be embodied as a lanyard 316 having a coupling tip 318. The coupling tip 318 may be configured to insert into and be retained by a corresponding coupling socket 320 formed in the electronic tag package 312 to effectively form an attachment to the at least one plant 102.

Figure 4:
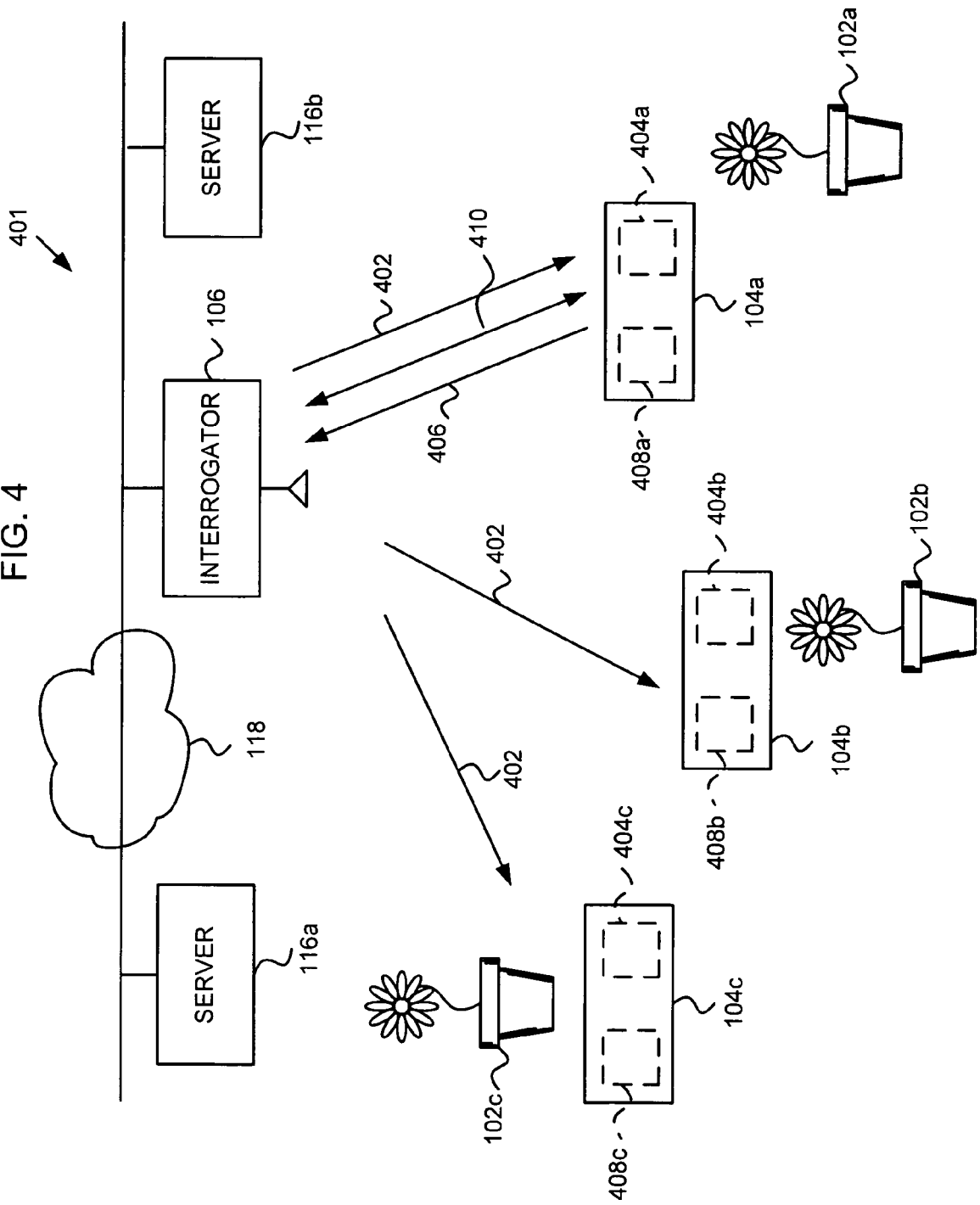
FIG. 4 is a diagram of a system for identifying plants according to at least one attribute, according to an embodiment.

FIG. 4 is a diagram of a system 401 for identifying plants 102a, 102b, 102c according to at least one attribute, according to an embodiment. A first electronic system resource 116a may be configured to receive a request for identification of at least one plant 102a, 102b, 102c having at least one attribute. At least one electronic tag interrogator 106 may be operatively coupled to the first electronic system resource 116a and configured to perform a conditional interrogation 402 of electronic tags 104a, 104b, 104c respectively associated with plants 102a, 102b, 102c that potentially have the at least one attribute. A second electronic system resource 116b may be configured to receive from the electronic tag interrogator 106 at least one identity of at least one plant 102a, 102b, 102c having the at least one attribute. According to an embodiment, the first electronic system resource 116a and the second electronic system resource 116b may be the same electronic system resource. For example, at least one of the first and second electronic system resources may include a computer, a server, a client, a terminal, a wireless terminal, a remote device, a cellular phone, a personal digital assistant, a point-of-sale system, a bar code scanner, and/or a portion of the electronic tag interrogator. A bar code scanner may include a hand-held or fixed mount system for reading linear and/or two-dimensional bar code symbols.

The system 401 for identifying plants according to attribute includes a plurality of electronic tags 104a, 104b, 104c configured for conditional response to the conditional interrogation 402. One or more plants that 102a that correspond to the attribute selected for conditional response may be associated with a corresponding electronic tag 104a that includes plant attribute data 404a in a memory circuit and/or is configured to measure a corresponding parameter with a sensor circuit 408a. The electronic tags 104a, 104b, 104c include at least one of a memory circuit 404a, 404b, 404c including plant attribute data or a sensing circuit 408a, 408b, 408c configured to sense at least one of a plant attribute or an attribute of a plant environment. The electronic tag interrogator 106 may be configured to perform the conditional interrogation 402 including a condition corresponding to the plant attribute data from the memory circuit 404a, 404b, 404c or the plant attribute or the attribute of the plant environment sensed by the sensing circuit 408a, 408b, 408c.

Electronic tags 104b, 104c respectively associated with one or more plants 102b, 102c that do not match the conditional response attribute may generally have respective plant attribute data 404b, 404c that does not match the condition for response. Alternatively, electronic tags 104b, 104c respectively associated with one or more plants 102b, 102c that do not match the conditional response attribute may generally have respective sensor circuits 408b, 408c that measure a corresponding parameter whose value falls outside the condition for response. Electronic tags 104a whose plant attribute data and/or sensed parameters 404a, 408a match the conditional interrogation 402 may be configured to provide a response 406 to the conditional interrogation 402. In contrast, electronic tags 104b, 104c whose plant attribute data 404b, 404c and/or for whom a parameter measured with a sensor circuit 408b, 408c does not meet the conditional interrogation 402 criteria, may generally not provide a response 406 to the conditional interrogation 402. Alternatively, electronic tags 104b, 104c whose plant attribute data 404b, 404c and/or a parameter measured with a sensor circuit 408b, 408c does not meet the conditional interrogation 402 criteria, may provide a different response, such as a null response, to the conditional interrogation 402, compared to a response 406 provided by an electronic tag 104a that does meet the response condition.

The first electronic resource 116a may further be configured to generate an interrogation command including syntax selected to receive responses from the electronic tags 104a corresponding to plants 102a that have or match the at least one attribute. The syntax may correspond to a broadcast interrogation 402. Alternatively, the syntax corresponds to a series of addressed interrogations 402.

The second electronic resource 116b may be further configured to process an order or a report for at least one plant 102a having the at least one attribute. The second electronic resource 116b may be further configured to generate an order to provide at least one treatment to the at least one plant having the at least one attribute. For example an ordered treatment may include one or more of planting, cutting, harvesting, grafting, staking, pruning, transplanting, repotting, controlling temperature, controlling root temperature, controlling light intensity, controlling light duration, controlling light schedule, controlling pH, humidification, dehumidification, watering, controlling watering volume, controlling watering duration, controlling watering schedule, fertilizing, determining fertilizer type, pesticide application, determining pesticide type, determining pesticide amount, herbicide application, determining herbicide type, determining herbicide amount, fungicide application, determining fungicide type, and/or determining fungicide amount.

At least one of the first or second resource 116a, 116b may be configured to drive the interrogator 106 to further interrogate 410 at least one of the plurality of electronic tags that conditionally responds 104a to obtain additional information corresponding to the electronic tag 104a or the corresponding at least one plant 102a. For example, if the electronic tag 104a includes additional information such as a location, age, price, or other condition of the corresponding at least one plant 102a, the interrogator 106 may provide further interrogation 410 to determine some or all of the additional information.

The electronic tag interrogator 106 may include at least one of a radio frequency tag interrogator, a passive radio frequency tag interrogator, an active radio frequency tag interrogator, a backscatter radio frequency tag interrogator, a half-duplex radio frequency tag interrogator, a full-duplex radio frequency tag interrogator, a touch memory interrogator, a proximity card interrogator, a smart card interrogator, and or a photonic tag interrogator.

At least one of the first and second electronic system resources 116a, 116b may include a computer, a server, a client, a terminal, a wireless terminal, a remote device, a cellular phone, a personal digital assistant, a point-of-sale system, and/or a portion of the electronic tag interrogator.

According to an embodiment, the electronic tags 104a, 104b, and/or 104c may be configured to respond according to substantially fixed conditional response criteria. According to another embodiment, the conditional response characteristics of the electronic tags 104a, 104b, and/or 104c may be configurable.

For embodiments where the conditional response characteristics of the electronic tags 104a, 104b, and/or 104c are configurable, the at least one electronic tag interrogator 106 may be further configured to transmit a configuration command (not shown) to the electronic tags 104a, 104b, 104c to configure the conditional response characteristics of the electronic tags. For example, the electronic tags 104a, 104b, 104c may each include a predetermined electronic memory address. The predetermined electronic memory address may be referred to as a conditional response register, an embodiment of which may be seen in block diagram form as 610 in FIG. 6. In response to receipt of a configuration command from the interrogator 106, the electronic tags 104a, 104b, 104c may be configured to associate data corresponding to a selected associated plant attribute with the predetermined electronic tag memory address.

For example, data in an electronic tag 104a may be structured such as by including a data identifier or application identifier with each data field. Upon receipt of a command to associate a given type of data with the predetermined memory address, the electronic tag 104a may parse data in its memory circuit, identify the data that is identified by the data identifier or application identifier, and either write the corresponding data into the predetermined memory address or write the data address of the corresponding data into the predetermined memory address. Associating data with the predetermined electronic memory address may include at least one of writing the data from the memory circuit to the predetermined electronic memory address or writing a pointer to an address in the memory circuit to the predetermined electronic memory address.

According to embodiments, the conditional interrogation 402 transmitted by the interrogator 106 may include a response condition. The data in the predetermined electronic tag memory address may form a plant attribute data field to which the interrogation response condition is compared.

A predetermined memory address may include a predetermined memory address range. The electronic tags 104a, 104b, 104c may include identification data. The predetermined memory address may be logically contiguous with the identification data. The conditional interrogation 402 may include a broadcast interrogation that specifies the plant attribute data. Alternatively, the conditional interrogation 402 may include a plurality of addressed interrogations that specify the plant attribute data appended to a sequence of electronic tag identification data.

As mentioned above, at least one of the electronic tags 104a, 104b, 104c may include a sensing circuit 408a, 408b, 408c configured to sense at least one of a plant attribute or an attribute of a plant environment. Associating data with the predetermined electronic memory address may include at least one of writing the data from the sensing circuit to the predetermined electronic memory address or writing a pointer to an address corresponding to data from the sensing circuit to the predetermined electronic memory address.

Figure 5:
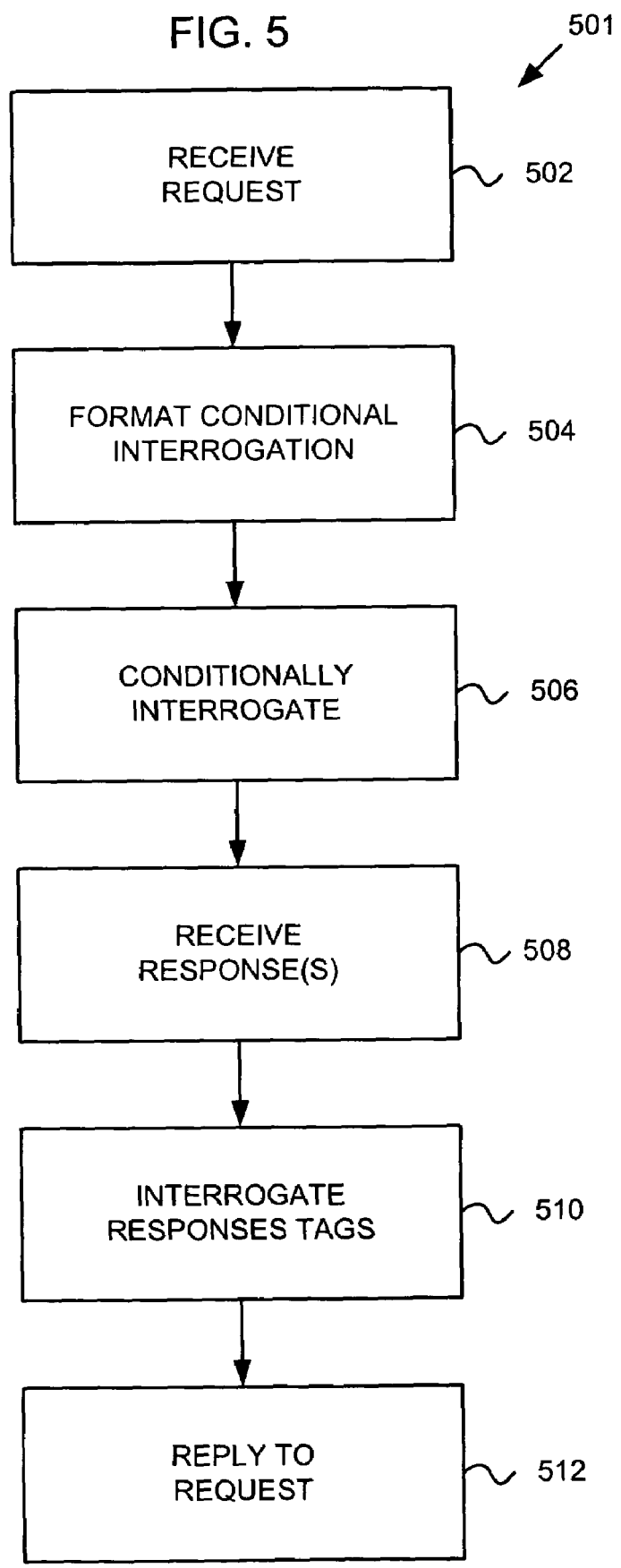
FIG. 5 is a flow chart illustrating a process for using the system of FIG. 4 to identify at least one plant having at least one attribute, according to an embodiment.

FIG. 5 is a flow chart illustrating a process 501 for using the system 401 of FIG. 4 to identify at least one plant having at least one attribute, according to an embodiment. In step 502, a request for information may be received, for example by the first network resource 116a. The request for information may include a request for information about one or more plants that correspond to one or more attributes. For example, a request may include a request for a particular species or cross of plant, or a request may include a request for plants that require a particular treatment such as fertilizing, or watering, or pruning.

Proceeding to step 504, a conditional interrogation may be formatted. For example a graphical interface selection of a request may be converted to an electronic tag interrogation syntax. Optionally, some embodiments may include conditional tag interrogations that are not driven by specific requests. In such cases, steps 502 and 504 may be omitted.

Proceeding to step 506, a conditional interrogation is transmitted to at least one electronic tag associated with at least one plant. The condition for the response may include an attribute corresponding to the at least one plant. The condition for the response may additionally or alternatively include a sensed parameter corresponding to the at least one plant or the environment of the at least one plant. Transmitting a conditional response interrogation may include transmitting a broadcast query, such as to a plurality of electronic tags.

The attribute may include a value of a plant-specific attribute. The attribute may include a parameter associated with the value of at least one plant-specific attribute. The parameter may include a logical value associated with the presence of the value of a plant-specific attribute being within a specified range. The parameter may include a logical value associated with the presence of the value of a plant-specific attribute being either greater or less than a specified value. The parameter may be associated with a function of parameters. The function may include a Boolean expression. The attribute may be associated with a change and/or a rate of change in a plant-specific attribute.

For example, the plant-specific attribute may includes plant species, plant variety, plant treatment status, plant condition, environmental condition, plant location, plant size, plant price, plant history, plant age, fruit or nut ripeness, and/or harvest schedule.

According to some embodiments, the at least one attribute may corresponds to performing a plant treatment. For example, the attribute may correspond to performing a plant treatment such as at least one of planting, cutting, harvesting, grafting, staking, pruning, transplanting, repotting, controlling temperature, controlling root temperature, controlling light intensity, controlling light duration, controlling light schedule, controlling pH, humidification, dehumidification, watering, controlling watering volume, controlling watering duration, controlling watering schedule, fertilizing, determining fertilizer type, pesticide application, determining pesticide type, determining pesticide amount, herbicide application, determining herbicide type, determining herbicide amount, fungicide application, determining fungicide type, and/or determining fungicide amount.

According to embodiments, data corresponding to the attribute may be stored in a memory circuit in the electronic tag or provided by a sensor circuit in the electronic tag. Data corresponding to the attribute is stored in a conditional response register in the electronic tag. The conditional response register may include data representative of verbose data accessible elsewhere in the electronic tag.

Optionally, the conditional response interrogation transmitted in step 506 may include a request or command for a sensor associated with the at least one plant to perform a measurement related to the attribute.

Optionally, the interrogator may transmit instructions to the electronic tag to update the conditional response register. For example, if previous conditional interrogations had involved plant parameters regarding plant treatment, and the next request received in step 502 involves identification of plants of a given species, the interrogator may transmit an interrogation, such as a broadcast interrogation, including a command to write data corresponding to plant species into the conditional response register. The interrogator may then subsequently transmit a conditional interrogation including a parameter corresponding to plant species.

Responsive to the conditional interrogation, one or more tags that meet the condition for response may respond. The process then proceeds to step 508 where at least one conditional response is received from an electronic tag associated with at least one plant having the attribute. Step 508 may involve not receiving any response from an electronic tag associated with at least one plant not having the attribute. Additionally or alternatively, step 508 may include receiving at least one conditional response from an electronic tag associated with at least one plant not having the attribute.

The response from the electronic tag received in step 508 may include identity data (e.g., identification) of one or more responding electronic tags. Additionally or alternatively, the conditional response may include additional data, such as data relevant to the conditional parameter.

Proceeding to step 510, one or more responding electronic tags may be further interrogated. For example, step 510 may include transmitting one or a plurality of addressed interrogations to at least one electronic tag that has responded to the conditional interrogation.

Step 510 may also include receiving additional data from the at least one responding electronic tag. The additional data may include data corresponding to the attribute. The additional data may include verbose data corresponding to the attribute, such as where the response in step 508 included truncated or otherwise abbreviated data corresponding to the attribute. The additional data may additionally or alternatively include data not corresponding to the attribute. For example, the additional data may includes data corresponding one or more secondary attributes of the at least one plant.

Optionally, the conditional interrogation transmitted in step 506 may include a condition for the response that includes a plurality of attributes corresponding to the at least one plant. Correspondingly, receiving the at least one response in step 508 may include receiving at least one response from at least one electronic tag associated with at least one plant having the plurality of attributes.

Optionally, the process 501 may include another step (not shown) of transmitting an addressed interrogation to an electronic tag associated with at least one plant that receives a treatment, the addressed interrogation including writing data corresponding to the performance of the treatment to the first electronic tag.

Proceeding to step 512, the original request may be replied to, such as by specifying at least one plant that meets one or more criteria requested by a potential purchaser, providing relevant inventory information to an inventory request, outputting a pick list for plants for shipment, and/or outputting a list of treatments to be applied to selected plants.

Figure 6:
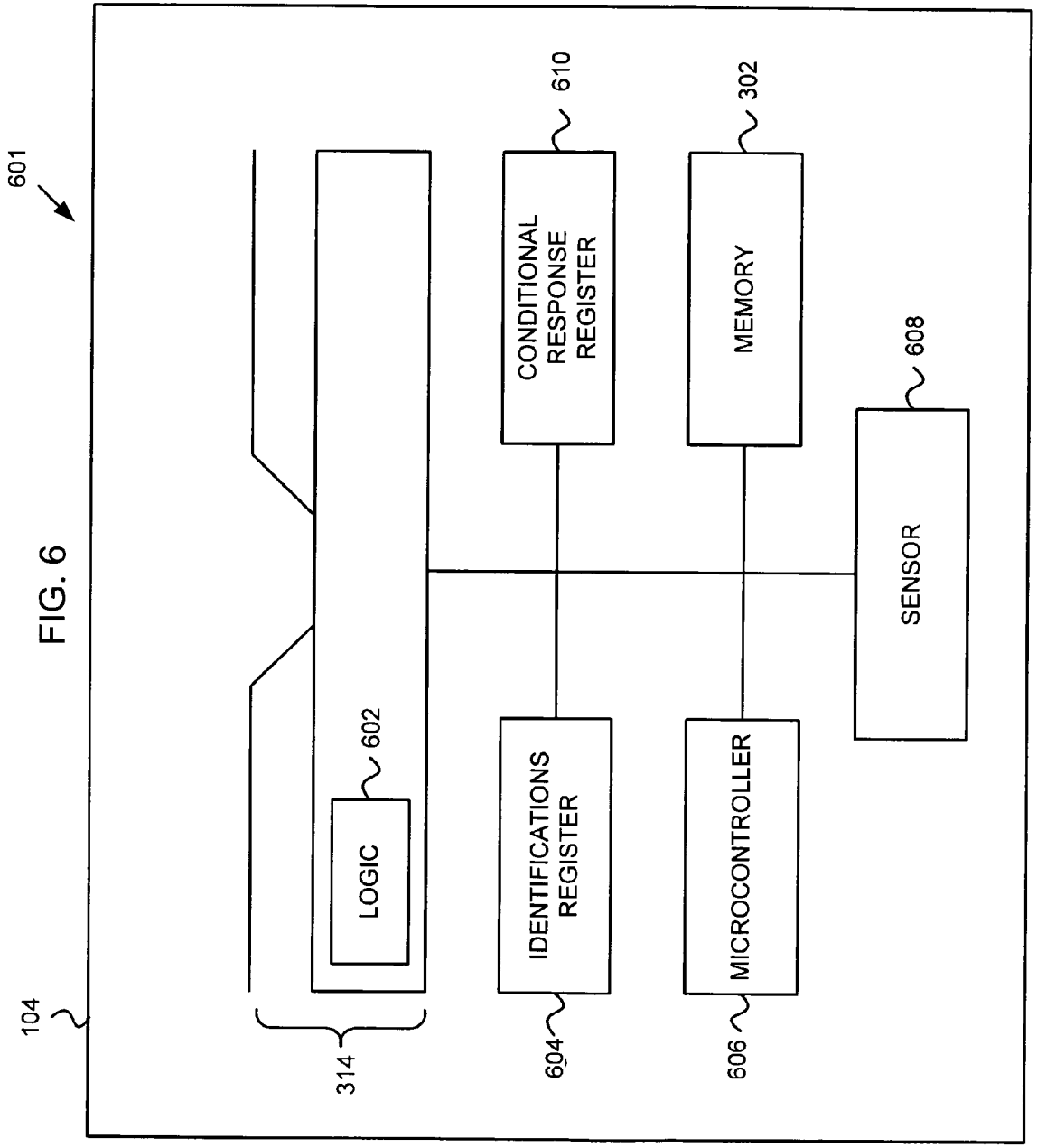
FIG. 6 is a block diagram of an electronic tag configured to conditionally respond to interrogation, according to an embodiment.

FIG. 6 is a block diagram of an embodiment 601 of an electronic tag 104 configured to conditionally respond to interrogation. For example, the electronic tag 104 may conditionally identify at least one plant.

An interrogation interface 314 is configured to conditionally respond to interrogation. Operatively coupled to the interrogation interface is at least one of a memory circuit 302, 610 including data corresponding to at least one attribute of at least one plant or a sensing circuit 608 configured to sense an attribute of at least one plant or a plant environment. The interrogation interface 314 may include logic 602 configured to respond to a conditional interrogation if tag identification data from an identification register 604 or data from the memory circuit 302, 610 or the sensing circuit 608 has a relationship to data specified in the conditional interrogation. According to some embodiments, the interrogation interface 314 may cooperate with an embedded microcontroller or microprocessor 606 to determine if data from the memory circuit 302, 610 or the sensing circuit 608 has a relationship to data specified in the conditional interrogation. According to some embodiments, the physical extents of the interrogation interface and a microcontroller 606 may overlap. According to some embodiments, the physical extent of the conditional response register 610 may overlap with the interrogation interface 314 and/or the memory 302.

The electronic tag 104 may include an interrogation interface 314 configured to not respond to the conditional interrogation if data from the memory circuit 302, 610 or the sensing circuit 608 has a different relationship to or no relationship to data specified in the conditional interrogation. For example, the interrogation interface 314 may include logic circuitry 602 configured to conditionally respond without waking other circuitry in the electronic tag 104. The interrogation interface 314 may be configured to respond to interrogation if the data from the memory circuit 610, 302 or the sensing circuit 608 has a Boolean relationship to the data specified in the conditional interrogation. For example, the interrogation interface 314 may be configured to respond to interrogation if the data from the memory circuit 610, 302 or the sensing circuit 608 equals the data specified in the conditional interrogation.

The memory circuit 302 may include a conditional response register 610 accessible by the interrogation interface 314. For example, the conditional response register 610 may be directly accessible by the interrogation interface 314 and/or the logic circuitry 602 in the interrogation interface 314 without powering other portions of the electronic tag.

According to an embodiment, the memory circuitry 302 may include an identification register 604. Alternatively, the identification register 604 may be embodied separate from other memory circuitry. For example, the identification register 604 may be embodied as circuitry within the interrogation interface 314. The conditional response register 610 may be configured to hold data appended to an electronic tag identity in the identification register 604. The appended conditional response data may be logically appended to the electronic tag identity data and/or physically appended to the electronic tag identity data. For example, the identification register 604 may include a range of storage transistors, flash memory cells, etc. and the conditional response register 610 may include an adjacent range of storage transistors, flash memory cells, etc.

According to an embodiment, data in the conditional response register 610 may correspond to a date or time of a previous treatment or a date or time of a scheduled treatment for the at least one corresponding plant. For example, data in the conditional response register 610 may correspond to a date or time of a previous watering or a date or time of a scheduled watering of the at least one plant.

The electronic tag 104 may include a microcontroller 606 operatively coupled to the interrogation interface 314. The conditional response by the interrogation interface 314 may be determined according to cooperation between the interrogation interface 314 and the microcontroller 606. For example, the microcontroller 606 may be configured to parse a condition from the conditional interrogation, read a corresponding attribute from the memory circuit 610, 302 or the sensing circuit 608, and enable a response to the interrogation if the attribute meets the condition. The microcontroller 606 may be configured to read the attribute from the memory circuit 302, 610 by selecting a memory address and reading data from the address. For example, the memory address selection may be included in the conditional interrogation or derived from an internal pointer. Alternatively or additionally, the microcontroller 606 may be configured to read the attribute from the sensing circuit 608.

According to an embodiment, the electronic tag 104 may include a microcontroller 606 operatively coupled to the interrogation interface 314 and a conditional response register 610 coupled to the interrogation interface 314. The interrogation interface 314 may be configured to respond to a conditional interrogation according to a comparison between the data specified in the interrogation and data in the conditional response register 610, for example using logic and/or addressing circuitry 602 in the interrogation interface 314. The microcontroller 606 may be configured to load the conditional response register 610 with data corresponding to data elsewhere in the memory circuit 302 or corresponding to data from the sensing circuit 608. The microcontroller 606 may be configured to select or format data for the conditional response register 610 responsive to receiving a configuration command via the interrogation interface 314.

The electronic tag 104 for conditionally identifying at least one plant may further include a package for coupling to the at least one plant. For example, the package (not shown) may include at least one of an integral tie, an attached elastic band, a plant stake, a plant label, a plant marker, a plant pot, a decorative pot, a hanging pot, a fiber pot, a peat pot, a coir pot, a plant tray, a seed flat, a starter tray, a plug tray, a propagation tray, a hydroponics container, a biodegradable material, a soil-born capsule, a non-soil potting mix-born capsule, a soil amendment-born capsule, a rooting medium-born capsule, a seed package, a bare root bag, a plant variety tag, a spike, a staple, a root ball wrap, burlap fabric, a seed mat, a fertilizer-born capsule, a chemical-born capsule, or a hydroponics-immersed capsule.

The memory circuit 302 and/or the conditional response register 610 may hold data corresponding to a variety of attributes of the at least one corresponding plant. For example, the data may include data corresponding to at least one of seed variety, seed batch, seed source, sprouting date, cutting variety, cutting batch, cutting date, cutting source, rhizome variety, rhizome batch, rhizome harvest date, rhizome source, bulb variety, bulb batch, bulb source, bulb harvest date, corm variety, corm batch, corm source, corm harvest date, planting date, graft date, soil temperature, soil pH, air temperature, light intensity, light duration, light schedule, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and packing date.

The sensing circuit 608 may include one or more sensors configured to sense a range of plant or plant environment attributes. For example, the sensor 608 may include one or more of a temperature sensor, a thermistor, a thermocouple, a bimetal spring, a biosensor, a microarray, an active region, a reactive monolayer; an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotube sensor, an electromagnetic transmissivity sensor, a piezo-electric sensor, or an electrode array.

Figure 7:
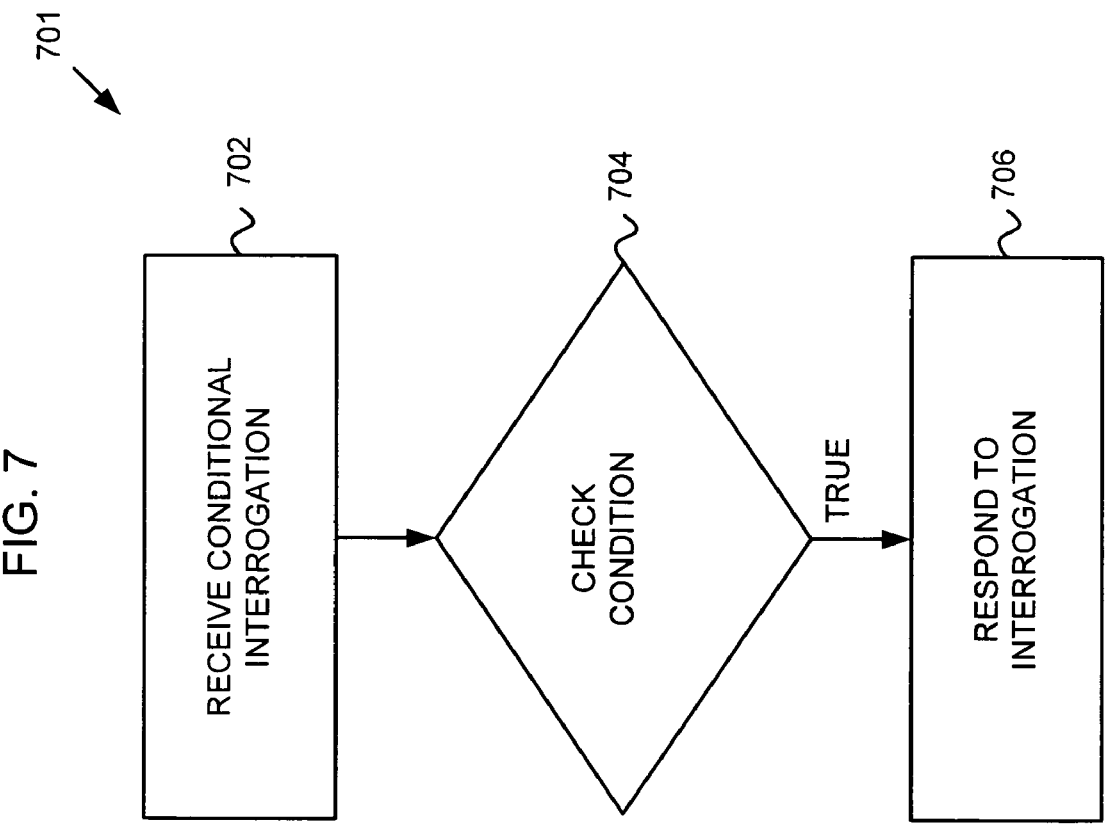
FIG. 7 is a flow chart illustrating a simplified process used by an electronic tag, such as the electronic tag of FIG. 6, for conditionally responding to a conditional interrogation, according to an embodiment.

FIG. 7 is a flow chart illustrating a simplified process 701 used by an electronic tag, such as the electronic tag of FIG. 6, for conditionally responding to a conditional interrogation, according to an embodiment. In step 702, a conditional interrogation is received through an interrogation interface. The conditional interrogation may specify at least one attribute of an associated at least one plant or plant environment. Proceeding to step 704, the electronic tag performs a comparison of the at least one attribute specified in the conditional interrogation to corresponding data (e.g. sensor data and/or stored data) in the electronic tag. According to an embodiment, if the specified data and/or relationship does not exist, the process ends and no response is made. If the attribute specified in the conditional interrogation has an implied or specified relationship to the data in the electronic tag, then the process 701 proceeds to step 706, wherein the electronic tag responds through the interrogation interface if the at least one attribute and the corresponding data have a specified relationship.

As described above, the corresponding data in the electronic tag may be provided by a memory circuit and/or by a sensor circuit. For example, the corresponding data may include a date or time of a previous treatment or a date or time of a scheduled treatment. For example the treatment may include watering of the plant or other treatment. Additionally or alternatively, the corresponding data may include other data related to the at least one plant. For example, the corresponding data in the electronic tag may include data corresponding to at least one of seed variety, seed batch, seed source, sprouting date, cutting variety, cutting batch, cutting date, cutting source, rhizome variety, rhizome batch, rhizome harvest date, rhizome source, bulb variety, bulb batch, bulb source, bulb harvest date, corm variety, corm batch, corm source, corm harvest date, planting date, graft date, soil temperature, soil pH, air temperature, light intensity, light duration, light schedule, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and/or packing date.

Referring to step 704, the comparison may be performed by a microcontroller operatively coupled to the interrogation interface. For example performing a comparison may include parsing the attribute from the conditional interrogation and reading the corresponding data from a memory circuit or a sensing circuit. Reading the corresponding data from the memory circuit or the sensing circuit may include selecting a memory address and reading data from the address. The memory address selection may be included in the conditional interrogation or may be derived from an internal pointer, for example. Alternatively, the conditional interrogation may specify a data label such as an application identifier or data identifier, and the microcontroller (or alternatively logic in the interrogation interface) may determine the data value based on matching the specified data label to a corresponding data label associated with relevant data.

According to an embodiment, the corresponding data in the electronic tag may be provided at a predetermined memory range. The predetermined memory range may be logically appended to an identification memory range. Responding to the conditional interrogation when the data from the sensor circuit or memory circuit meets at least one criterion specified in the conditional interrogation may include responding to the conditional interrogation when at least one criterion specified in the conditional interrogation has a relationship to data in a conditional response register (such as in a conditional response register described above in conjunction with FIG. 6) accessible by the interrogation interface. The conditional response register may be directly accessible by the interrogation interface without powering a microprocessor or microcontroller in the electronic tag. According to an embodiment, receiving the conditional interrogation and responding to the conditional interrogation may be performed by an interrogation interface in the electronic tag, for example substantially without accessing other portions of the electronic tag.

According to an embodiment, step 704 may include receiving data from a sensor circuit or from a memory circuit corresponding to at least one attribute of at least one associated plant. Step 706 may be performed when the data from the sensor circuit or memory circuit meets at least one criterion specified in the conditional interrogation. Alternatively, various logical relationships to the specified data may be performed. For example, the electronic tag may respond to the conditional interrogation if data from the memory circuit or the sensing circuit does not meet at least one criterion specified in the conditional interrogation. Alternatively, the electronic tag may not respond to the conditional interrogation if data from the memory circuit or the sensing circuit does not meet at least one criterion specified in the conditional interrogation. Accordingly the conditional interrogation may include a Boolean relationship between data specified in the conditional interrogation and data from the memory circuit or the sensing circuit. Of course, the at least one specified criterion may include equivalence between data specified in the conditional interrogation and data from the memory circuit or the sensing circuit.

According to embodiments, the sensor circuit and/or the memory circuit may be portions of the electronic tag. Alternatively, the memory circuit and/or sensor circuit may be operatively coupled, but separate from the electronic tag.

Referring to step 706, responding may include reporting an electronic tag identification value. This may be used, for example, by the system as simple identification, or may be used to construct one or more further addressed interrogations of the electronic tag. Additionally or alternatively, responding may include reporting the data corresponding to the at least one attribute.

The electronic tag may read data from a memory circuit and/or from a sensor circuit. Accordingly, reporting at least one condition corresponding to at least one plant may further include performing at least one measurement with the sensor circuit in response to the receiving a conditional interrogation. The sensor circuit may include various types. For example, the sensor circuit may include at least one of a temperature sensor, a thermistor, a thermocouple, a bimetal spring, a biosensor, a microarray, an active region, a reactive monolayer; an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotube sensor, an electromagnetic transmissivity sensor, a piezo-electric sensor, and/or an electrode array.

Similarly, data from the sensor circuit may include at least one of temperature, a protein presence or concentration, an alkaloid presence or concentration, a chemical presence or concentration, an inertia, light presence or intensity, magnetic field presence or intensity, pressure, thermal conductivity, electrical conductivity, moisture, electromagnetic transmissivity, water, fertilizer presence or concentration, herbicide presence or concentration, and/or fungicide presence or concentration.

Figure 8:
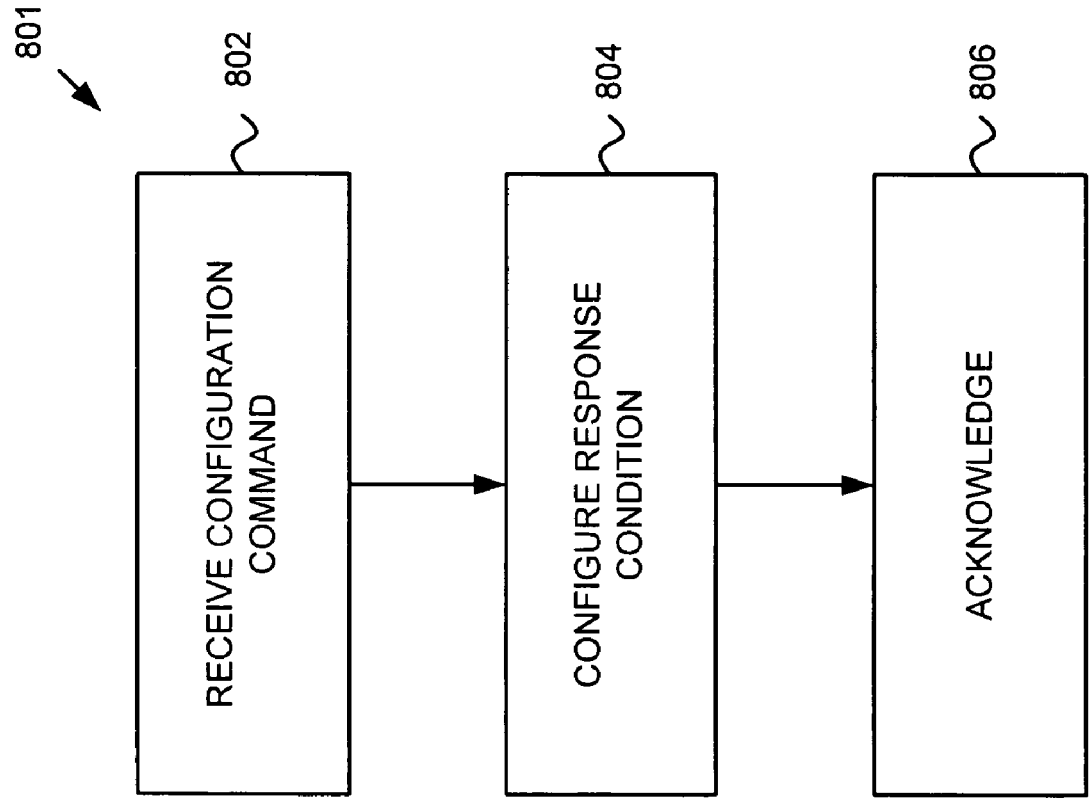
FIG. 8 is a flow chart showing a process used by an electronic tag to configure its conditional response characteristics responsive to receiving a configuration command through an interrogation interface, according to an embodiment.

FIG. 8 is a flow chart showing a process 801 used by an electronic tag to configure its conditional response characteristics responsive to receiving a configuration command through an interrogation interface, according to an embodiment.

Referring to FIG. 6, the electronic tag 104 may include a conditional response register 610 coupled to the interrogation interface 314. The interrogation interface 314 may be configured to respond to a conditional interrogation according to a comparison between the data specified in the interrogation and data in the conditional response register 610, for example using logic and/or addressing circuitry 602 in the interrogation interface 314.

The conditional response characteristics of the electronic tag may be selected by loading the conditional response register 610 with selected data, for example data corresponding to data elsewhere in the memory circuit 302 or corresponding to data from the sensing circuit 608. The microcontroller 606 may be configured to select or format data for the conditional response register 610 responsive to receiving a configuration command via the interrogation interface 314.

Referring again to FIG. 8, the electronic tag may receive a configuration command through the interrogation interface in step 802. The configuration command may include a command to copy a particular type of data from the memory to the conditional response register.

After receiving the configuration command in step 802, the process proceeds to step 804. In step 804, the electronic tag may respond by loading specified data or a specified derivative of data from elsewhere in the electronic tag into the predetermined memory range. For example the data from elsewhere in the electronic tag may include a portion of a memory circuit or a sensor circuit. Optionally, the electronic tag may then execute step 806, where it may acknowledge receipt of the configuration command and/or execution of corresponding response condition configuration.

For example, if a system has a need to identify plants that have a low light requirement, the configuration command may copy data from the electronic tag memory corresponding to the plant light requirement into the conditional response register. For example, the interrogation may include a broadcast interrogation including a command for substantially all electronic tags within interrogation range to copy the plant light requirement data into the respective conditional response registers.

For example, a subsequent conditional interrogation may then be broadcast requesting a response from any electronic tag where the conditional response data equals "LOW"; and tags corresponding to plants with low light requirements may respond to the conditional interrogation.

The foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The reader will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader may translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.; and may include systems having more than one of any of A, B or C, for example, $A_1$, $A_2$, and B, or A, $B_1$, $B_2$, $B_3$, and C.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for identifying at least one plant having at least one attribute, comprising:
   transmitting a conditional response interrogation to at least one electronic tag associated with at least one plant, wherein the condition for the response includes an attribute corresponding to the at least one plant; and
   receiving at least one conditional response from a first electronic tag associated with at least one plant having the attribute.

2. The method for identifying at least one plant having at least one attribute of claim 1, further comprising:
   receiving at least one conditional response from a second electronic tag associated with at least one plant not having the attribute.

3. The method for identifying at least one plant having at least one attribute of claim 1, further comprising:
   not receiving any response from a second electronic tag associated with at least one plant not having the attribute.

4. The method for identifying at least one plant having at least one attribute of claim 1, wherein the attribute includes a value of a plant-specific attribute.

5. The method for identifying at least one plant having at least one attribute of claim 1, wherein the attribute includes a parameter associated with the value of at least one plant-specific attribute.

6. The method for identifying at least one plant having at least one attribute of claim 5, wherein the parameter includes a logical value associated with the presence of the value of a plant-specific attribute being within a specified range.

7. The method for identifying at least one plant having at least one attribute of claim 5, wherein the parameter includes a logical value associated with the presence of the value of a plant-specific attribute being either greater or less than a specified value.

8. The method for identifying at least one plant having at least one attribute of claim 5, wherein the parameter is associated with a function of parameters.

9. The method for identifying at least one plant having at least one attribute of claim 8, wherein the function is a Boolean expression.

10. The method for identifying at least one plant having at least one attribute of claim 1, wherein the attribute is associated with a change in a plant-specific attribute.

11. The method for identifying at least one plant having at least one attribute of claim 1, wherein the attribute is associated with a rate of change in a plant-specific attribute.

12. The method for identifying at least one plant having at least one attribute of claim 4, wherein the plant-specific attribute includes plant species, plant variety, plant treatment status, plant condition, environmental condition, plant location, plant size, plant price, plant history, plant age, fruit or nut ripeness, or harvest schedule.

13. The method for identifying at least one plant having at least one attribute of claim 1, wherein data corresponding to the attribute is stored in a memory circuit in the electronic tag or provided by a sensor circuit in the electronic tag.

14. The method for identifying at least one plant having at least one attribute of claim 1, wherein data corresponding to the attribute is stored in a conditional response register in the electronic tag.

15. The method for identifying at least one plant having at least one attribute of claim 14, wherein the conditional response register includes data representative of verbose data accessible elsewhere in the electronic tag.

16. The method for identifying at least one plant having at least one attribute of claim 15, wherein the at least one electronic tag includes:
   an interrogation interface;
   a microcontroller accessible by the interrogation interface;
   at least one of a memory circuit or a sensor accessible by the microcontroller; and
   a conditional response register accessible by the interrogation interface and the microcontroller.

17. The method for identifying at least one plant having at least one attribute of claim 16, wherein the conditional response register is accessible by the interrogation interface without requiring the microcontroller to execute instructions.

18. The method for identifying at least one plant having at least one attribute of claim 16, further comprising:
   transmitting instructions to the first electronic tag to update the conditional response register.

19. The method for identifying at least one plant having at least one attribute of claim 1, wherein the at least one response from the first electronic tag includes first identity data.

20. The method for identifying at least one plant having at least one attribute of claim 19, further comprising:
   transmitting an addressed interrogation to the first electronic tag.

21. The method for identifying at least one plant having at least one attribute of claim 20, further comprising:
   receiving additional data from the first electronic tag.

22. The method for identifying at least one plant having at least one attribute of claim 21, wherein the additional data includes data corresponding to the attribute.

23. The method for identifying at least one plant having at least one attribute of claim 22, wherein the additional data includes verbose data corresponding to the attribute.

24. The method for identifying at least one plant having at least one attribute of claim 21, wherein the additional data includes data not corresponding to the attribute.

25. The method for identifying at least one plant having at least one attribute of claim 24, wherein the attribute is a primary attribute; and
   wherein the additional data includes data corresponding to one or more secondary attributes of the at least one plant.

26. The method for identifying at least one plant having at least one attribute of claim 1:
   wherein the condition for the response includes a plurality of attributes corresponding to the at least one plant; and
   wherein receiving the at least one response includes receiving at least one response from a first electronic tag associated with at least one plant having the plurality of attributes.

27. The method for identifying at least one plant having at least one attribute of claim 1, wherein the at least one electronic tag includes a plurality of electronic tags.

28. The method for identifying at least one plant having at least one attribute of claim 1, wherein the first electronic tag includes a plurality of first electronic tags.

29. The method for identifying at least one plant having at least one attribute of claim 28, further comprising:
   transmitting a plurality of addressed interrogations to at least some of the first electronic tags.

30. The method for identifying at least one plant having at least one attribute of claim 1, wherein the at least one electronic tag includes at least one of a radio frequency tag, a passive radio frequency tag, an active radio frequency tag, a backscatter radio frequency tag, a half-duplex radio frequency tag, a full-duplex radio frequency tag, a touch memory device, a proximity card, a smart card, a photonic tag, a read-only electronic tag, a read/write electronic tag, or a write-once-read-many-times (WORM) electronic tag.

31. The method for identifying at least one plant having at least one attribute of claim 1, wherein transmitting a conditional response interrogation includes transmitting a broadcast query.

32. The method for identifying at least one plant having at least one attribute of claim 1, wherein the at least one attribute corresponds to performing a plant treatment; and further comprising:
   performing a treatment on the at least one plant having the attribute.

33. The method for identifying at least one plant having at least one attribute of claim 32, wherein performing the treatment includes at least one of planting, cutting, harvesting, grafting, staking, pruning, transplanting, repotting, controlling temperature, controlling root temperature, controlling light intensity, controlling light duration, controlling light schedule, controlling pH, humidification, dehumidification, watering, controlling watering volume, controlling watering duration, controlling watering schedule, fertilizing, determining fertilizer type, pesticide application, determining pesticide type, determining pesticide amount, herbicide application, determining herbicide type, determining herbicide amount, fungicide application, determining fungicide type, or determining fungicide amount.

34. The method for identifying at least one plant having at least one attribute of claim 32, further comprising transmitting an addressed interrogation to the first electronic tag associated with the at least one plant, the addressed interrogation including writing data corresponding to the performance of the treatment to the first electronic tag.

35. The method for identifying at least one plant having at least one attribute of claim 1, wherein the conditional response interrogation comprises a request for a sensor associated with the at least one plant to perform a measurement related to the attribute.

36. An electronic tag for conditionally identifying at least one plant, comprising:
   an interrogation interface configured to conditionally respond to interrogation;
   operatively coupled to the interrogation interface, at least one of a memory circuit including data corresponding to at least one attribute of at least one plant or a sensing circuit configured to sense an attribute of at least one plant or a plant environment; and
   wherein the interrogation interface is configured to respond to a conditional interrogation if data from the memory circuit or the sensing circuit has a relationship to data specified in the conditional interrogation.

37. The electronic tag for conditionally identifying at least one plant of claim 36, wherein the interrogation interface is configured to not respond to the conditional interrogation if data from the memory circuit or the sensing circuit has a different relationship to or no relationship to data specified in the conditional interrogation.

38. The electronic tag for conditionally identifying at least one plant of claim 36, wherein the interrogation interface is configured to respond to interrogation if the data from the memory circuit or the sensing circuit has a Boolean relationship to the data specified in the conditional interrogation.

39. The electronic tag for conditionally identifying at least one plant of claim 38, wherein the interrogation interface is configured to respond to interrogation if the data from the memory circuit or the sensing circuit equals the data specified in the conditional interrogation.

40. The electronic tag for conditionally identifying at least one plant of claim 36, wherein the memory circuit includes a conditional response register accessible by the interrogation interface.

41. The electronic tag for conditionally identifying at least one plant of claim 40, wherein the conditional response register is directly accessible by the interrogation interface without powering other portions of the electronic tag.

42. The electronic tag for conditionally identifying at least one plant of claim 40, further comprising:
   an identification register; and
   wherein the conditional response register is configured as data appended to an electronic tag identity in the identification register.

43. The electronic tag for conditionally identifying at least one plant of claim 42, wherein the appended conditional response data is logically appended to the electronic tag identity data.

44. The electronic tag for conditionally identifying at least one plant of claim 40, wherein data in the conditional response register corresponds to a date or time of a previous treatment or a date or time of a scheduled treatment.

45. The electronic tag for conditionally identifying at least one plant of claim 44, wherein the treatment includes watering.

46. The electronic tag for conditionally identifying at least one plant of claim 36, wherein data in the memory circuit corresponds to a date or time of a previous treatment or a date or time of a scheduled treatment.

47. The electronic tag for conditionally identifying at least one plant of claim 46, wherein the treatment includes watering.

48. The electronic tag for conditionally identifying at least one plant of claim 36, further comprising:
   a microcontroller operatively coupled to the interrogation interface; and
   wherein conditional response by the interrogation interface is determined according to cooperation between the interrogation interface and the microcontroller.

49. The electronic tag for conditionally identifying at least one plant of claim 48, wherein the microcontroller is configured to:
   parse a condition from the conditional interrogation;
   read a corresponding attribute from the memory circuit or the sensing circuit; and
   enable a response to the interrogation if the attribute meets the condition.

50. The electronic tag for conditionally identifying at least one plant of claim 49, wherein the microcontroller is configured to read the attribute from the memory circuit by selecting a memory address and reading data from the address.

51. The electronic tag for conditionally identifying at least one plant of claim 50, wherein the memory address selection is included in the conditional interrogation or is derived from an internal pointer.

52. The electronic tag for conditionally identifying at least one plant of claim 49, wherein the microcontroller is configured to read the attribute from the sensing circuit.

53. The electronic tag for conditionally identifying at least one plant of claim 36, further comprising:
   a microcontroller operatively coupled to the interrogation interface; and
   a conditional response register coupled to the interrogation interface;
   wherein the interrogation interface is configured to respond to a conditional interrogation according to a comparison between the data specified in the interrogation and data in the conditional response register; and
   wherein the microcontroller is configured to load the conditional response register with data corresponding to data elsewhere in the memory circuit or corresponding to data from the sensing circuit.

54. The electronic tag for conditionally identifying at least one plant of claim 53, wherein the microcontroller is configured to select or format data for the conditional response register responsive to receiving a configuration command via the interrogation interface.

55. The electronic tag for conditionally identifying at least one plant of claim 36, including at least one of a radio frequency tag, a passive radio frequency tag, an active radio frequency tag, a backscatter radio frequency tag, a half-duplex radio frequency tag, a full-duplex radio frequency tag, a touch memory device, a proximity card, a smart card, a photonic tag, a read-only electronic tag, a read/write electronic tag, or a write-once-read-many-times (WORM) electronic tag.

56. The electronic tag for conditionally identifying at least one plant of claim 36, further including a package including at least one of an integral tie, an attached elastic band, a plant stake, a plant label, a plant marker, a plant pot, a decorative pot, a hanging pot, a fiber pot, a peat pot, a coir pot, a plant tray, a seed flat, a starter tray, a plug tray, a propagation tray, a hydroponics container, a biodegradable material, a soil-born capsule, a non-soil potting mix-born capsule, a soil amendment-born capsule, a rooting medium-born capsule, a seed package, a bare root bag, a plant variety tag, a spike, a staple, a root ball wrap, burlap fabric, a seed mat, a fertilizer-born capsule, a chemical-born capsule, or a hydroponics-immersed capsule.

57. The electronic tag for conditionally identifying at least one plant of claim 36, wherein the interrogation interface is operatively coupled to a memory circuit including data corresponding to at least one of seed variety, seed batch, seed source, sprouting date, cutting variety, cutting batch, cutting date, cutting source, rhizome variety, rhizome batch, rhizome harvest date, rhizome source, bulb variety, bulb batch, bulb source, bulb harvest date, corm variety, corm batch, corm source, corm harvest date, planting date, graft date, soil temperature, soil pH, air temperature, light intensity, light duration, light schedule, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule, fungicide type, fungicide amount, fungicide application, fungicide schedule, forcing conditions, pruning application, pruning schedule, pruning style, caretaker identity, plant source identity, shipper identity, ship date, packer identity, and packing date.

58. The electronic tag for conditionally identifying at least one plant of claim 36, wherein the interrogation interface is operatively coupled to a sensing circuit including at least one of a temperature sensor, a thermistor, a thermocouple, a bimetal spring, a biosensor, a microarray, an active region, a reactive monolayer, an SPR sensor, a reduction-oxidation binding current sensor, a chemical sensor, an inertial sensor, a light sensor, a magnetic sensor, a pressure sensor, a thermal conductivity sensor, an electrical conductivity sensor, a moisture sensor, a carbon nanotube sensor, an electromagnetic transmissivity sensor, a piezo-electric sensor, or an electrode array.

* * * * *